United States Patent
Brouard et al.

(10) Patent No.: US 9,188,681 B2
(45) Date of Patent: Nov. 17, 2015

(54) ION DETECTOR

(75) Inventors: Mark Brouard, Oxford (GB); Claire Vallance, Oxford (GB); Andrei Nomerotski, Oxford (GB); Renato Turchetta, Didcot (GB)

(73) Assignee: ISIS INNOVATION LIMITED, Oxford Oxfordshire (GB)

( * ) Notice: Subject to any disclaimer, the term of this patent is extended or adjusted under 35 U.S.C. 154(b) by 0 days.

(21) Appl. No.: 14/232,086

(22) PCT Filed: Jun. 29, 2012

(86) PCT No.: PCT/GB2012/051518
§ 371 (c)(1),
(2), (4) Date: Feb. 25, 2014

(87) PCT Pub. No.: WO2013/007981
PCT Pub. Date: Jan. 17, 2013

(65) Prior Publication Data
US 2014/0151564 A1 Jun. 5, 2014

(30) Foreign Application Priority Data
Jul. 12, 2011 (GB) .................................. 1111915.3
Oct. 27, 2011 (GB) .................................. 1118614.5

(51) Int. Cl.
*G01T 1/20* (2006.01)
(52) U.S. Cl.
CPC ............. *G01T 1/2006* (2013.01); *G01T 1/2018* (2013.01)
(58) Field of Classification Search
CPC .............................. G01T 1/2018; G01T 1/2006
USPC ........................................................... 250/362
See application file for complete search history.

(56) References Cited

U.S. PATENT DOCUMENTS

| | | | |
|---|---|---|---|
| 2005/0205796 A1* | 9/2005 | Bryman | 250/370.11 |
| 2007/0187611 A1 | 8/2007 | Chowdhury et al. | |
| 2008/0308738 A1 | 12/2008 | Li et al. | |
| 2010/0270462 A1* | 10/2010 | Nelson et al. | 250/252.1 |
| 2010/0294931 A1* | 11/2010 | Zarchin et al. | 250/310 |
| 2011/0095177 A1* | 4/2011 | Giannakopulos et al. | 250/282 |
| 2011/0095178 A1* | 4/2011 | Giannakopulos et al. | 250/282 |

FOREIGN PATENT DOCUMENTS

| | | |
|---|---|---|
| WO | WO2006111883 | 10/2006 |
| WO | WO2007127607 | 11/2007 |
| WO | WO2010070487 | 6/2010 |

OTHER PUBLICATIONS

Muller et al., "A Low-Temperature Proton Detector for a Neutron Lifetime Experiment", Nuclear Instruments & Methods in Physics Research. Section A: Accelerators, Spectrometers, Detectors, and Associated Equipment, Elsevier BV * North-Holland, Netherlands, vol. 611, No. 2-3, Dec. 1, 2009, pp. 289-292.*

(Continued)

*Primary Examiner* — Marcus Taningco
(74) *Attorney, Agent, or Firm* — Ober, Kaler, Grimes & Shriver; Royal W. Craig

(57) ABSTRACT

An ion detector (1) comprising a semi-conductor avalanche photodiode (4) and a scintillation layer (2), the scintillation layer having a thickness in the range 0.1 mm to 00 mm, the scintillation layer arranged to generate photons towards the photodiode resulting from ions impinging on the scintillation layer.

13 Claims, 5 Drawing Sheets

(56) References Cited

OTHER PUBLICATIONS

Yanagida et al, Comparative Study of Ga, In, and Mg doped ZnO thin-film scintillator with Geiger mode APD, IEEE Nuclear Science Symposium Conference Record, 2009, pp. 1452-1455.

Johnson et al., A geiger-mode avalanche photodiode array for X-ray photon correlation spectroscopy, Journal of Synchroton Radiation, 2009, 16, pp. 105-109.

* cited by examiner

ION DETECTOR

TECHNICAL FIELD

The present invention relates generally to ion detectors

BACKGROUND

Detectors used in known Time-of-Flight (TOF) mass spectrometers, as well as the position sensitive detectors used in imaging mass spectrometry and other applications which require detection of ions with energies in the range of 1-100 keV, use micro-channel plates (MCPs) to convert incident ions into a measurable current. The avalanche of electrons produced when an ion strikes the front surface of an MCP leads to a typical gain of around $10^3$, and often a pair of matched MCPs is used to achieve gains of up to $10^6$. For imaging applications, the electrons can either be accelerated towards a phosphor screen, and light from the phosphor registered with a fast pixel imager, or the electrons can be detected directly after the MCPs using a delay line detector or one of the new generation of CMOS-based electron detectors. Optical detection using a phosphor is currently the standard for most imaging experiments, though the decay time of the phosphor imposes a considerable limitation on the attainable time resolution in such measurements.

In any detector based on MCPs, the 'dead' areas between the MCP pores mean that the detection efficiency is limited to about 50%. Arrangements are available to improve the efficiency up to about 80-90%, which include various surface coatings and the use of electrostatic meshes above the MCP surface. However, the improved detection efficiency is often achieved at the cost of spatial resolution and a considerable increase in experimental complexity.

We seek to provide an improved ion detector.

SUMMARY

According to one aspect of the invention there is provided an ion detector comprising a semi-conductor avalanche photodiode and a scintillation layer, the scintillation layer having a thickness in the range 0.1 µm to 100 µm, the scintillation layer arranged to generate photons collected by the photodiode resulting from ions impinging on the scintillation layer.

One embodiment of the invention may be viewed as a new type of direct ion detector based on an array of photodiodes working as single photon avalanche detectors coated with a thin layer of scintillator. Ions incident on the scintillator produce light which is registered by the photodiodes. Position of an ion incidence can be determined by the coordinates of the hit photodiode Preferably the photodiode has sensitivity to detect a single photon.

Preferably the photodiode comprises a reversely biased photosensitive p-n junction.

Preferably the detector comprises a spatially distributed array of avalanche photodiodes.

Most preferably the detector comprises a pixelated array of photodiodes.

Preferably the photodetector is a silicon-based photodiode.

Preferably the scintillation layer has been formed in situ on the photodiode by a deposition process.

Preferably the scintillation layer is a pre-formed component attached to the photodiode.

Preferably the detector is capable of detecting ions having energies of the order of/in the range 0-100 keV, and preferably of the order of/in the range 0 to 20 keV.

Preferably the device is an integrated device.

Preferably the device comprises an optical lens located between the scintillator layer and the photodiode.

Preferably the thickness of the scintillator layer is less than a distance between photosensitive regions of the neighbouring photodiodes.

Preferably the width of the photosensitive region is in the range between 10 µm to 100 µm.

Preferably the thickness of the scintillator layer is in the range of 0.1 to tens of µm's.

Preferably the position of an ion incidence can be determined by the coordinates of the hit photodiode.

Preferably the detector is capable of being used at at least atmospheric pressure, for example at a prevailing air pressure of at least 100 kPa.

According to a second aspect of the invention there is provided a method of ion detection comprising use of the detector of the first aspect of the invention.

BRIEF DESCRIPTION OF THE DRAWINGS

Various embodiments of the invention will now be described, by way of example only, with reference to the following drawings in which.

DETAILED DESCRIPTION

Figure 1:
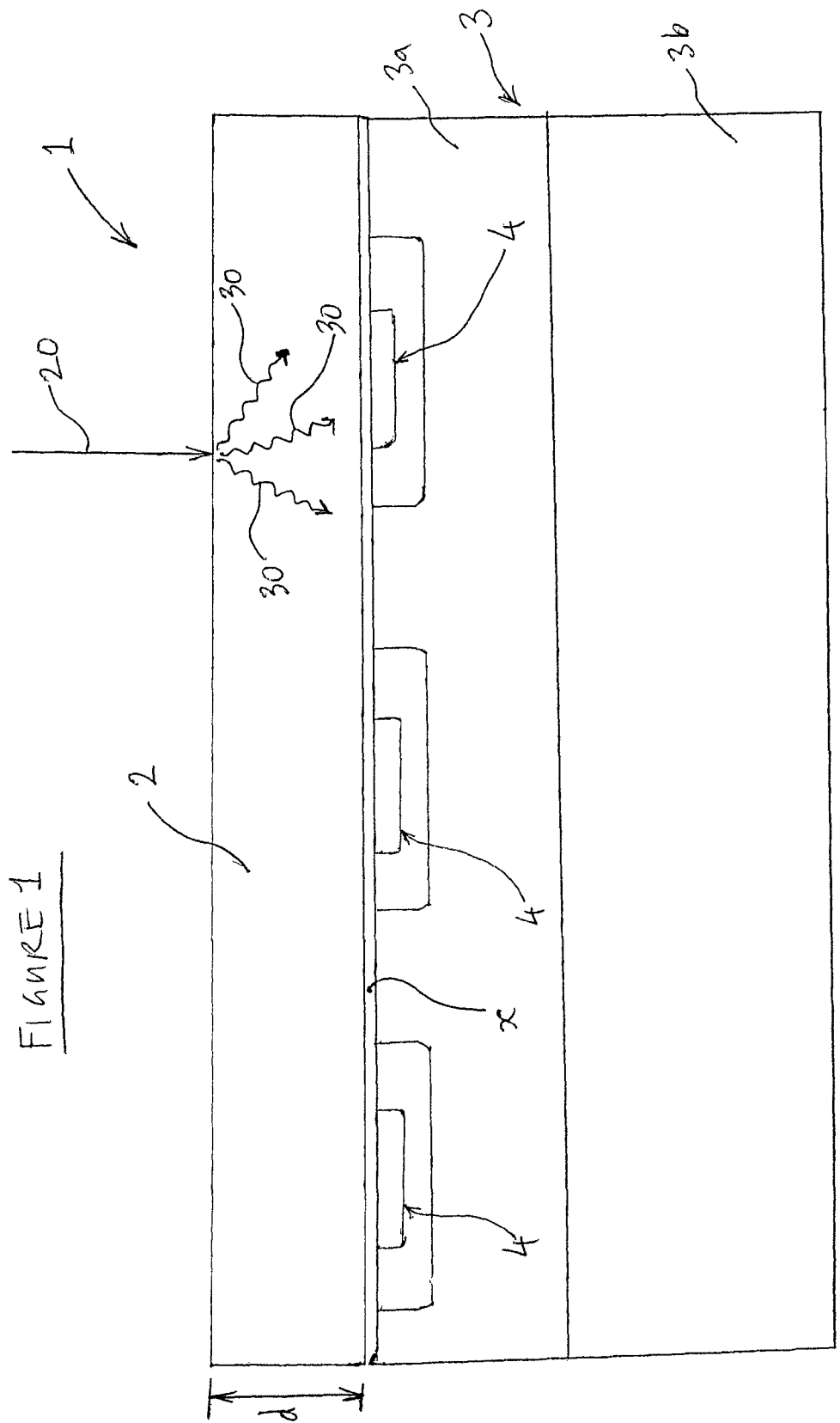
FIG. 1 is a schematic cross-sectional view of an ion detector.

With reference to FIG. 1 there is shown an ion detector 1 which comprises a scintillator layer 2 and several semi-conductor single photon avalanche detectors 4. The detector 1 is advantageously capable of detecting low energy ions of the order of 10 keV.

The SPAD (single photon avalanche detectors) device 3 comprises a plurality of reversely-biased p-n junctions 4 in FIG. 2 below, each effectively forming a photodetector. The p-n junctions 4 are set within a p-epitaxial layer 3a. The photodetector further comprises a p-substrate layer 3b. The junction is biased above the breakdown voltage. In this case, no current flows in the junction but the high electric field present there means that any charge carrier reaching the junction will generate an avalanche. The carrier can be thermally or tunnelling generated, giving rise to the so called dark counts, or photon generated. In both situations, a very fast and large signal is generated with such a high gain that the process becomes self-sustained. In order to stop it, a quenching circuit is included within the SPAD. The circuit is not illustrated, but suitable quenching circuits are known in the art. The SPAD signal has a sub-nanosecond rise time providing high intrinsic timing resolution; down to a 10 ps level. Signals produced from the photodiode 4 have large amplitudes which enable single photon detection. The signal current continues until the junction voltage drops to the breakdown voltage due to the quenching circuit. After this the photodiode capacitance is recharged for the junction to be photosensitive again. The typical recovery time of the photodiode 3 is 10-100 ns.

The p-n junctions 4 are arranged in a two dimensional array to achieve spatial mapping of ions which impinge onto the detector 1.

The scintillator layer 2 has a thickness d, which is in the range of 0.1 μm to tens of μm's. The incorporation of the layer 2 can be achieved either through a vacuum deposition process or by direct attachment of a thin pre-formed scintillator plate/layer to the photodiode 3. On an ion 20 reaching the scintillator layer 2, photons 30 are emitted, part of which is collected on to a photosensitive region of the photodiode 3. Any suitable scintillator material may be used, such as LYSO ($Lu_{1.8}Y_{0.2}SiO_5(Ce)$), or $BaF_2$.

Because the thickness of the scintillator is much less than the pixel pitch (ie the distance between the neighbouring photodetectors), typically 10-100 micron, most of the photons will be collected by the pixels closest to the position of the incident ion. This will provide the device with enhanced spatial resolution.

Preferably, opposing surfaces of the scintillator layer 2 and the photodetector 3 are spaced apart by a few microns, shown by x in FIG. 1, but it is also preferred that this spacing is minimised. The spacing may be completely or partly filled with an optically transparent substance which couples the scintillation layer 2 to the photodetector 3.

In use, the detector can be directed towards a source of ions. On impinging on the scintillator layer 2, photons are generated towards the photosensitive regions of each of the photodetectors. Signals received from the p-n junctions can then be used to provide information on time of arrival and position of arrival. By virtue of multiple photodetectors being used simultaneously, parallelism is achieved whereby different ions can be detected in parallel.

Figure 2:
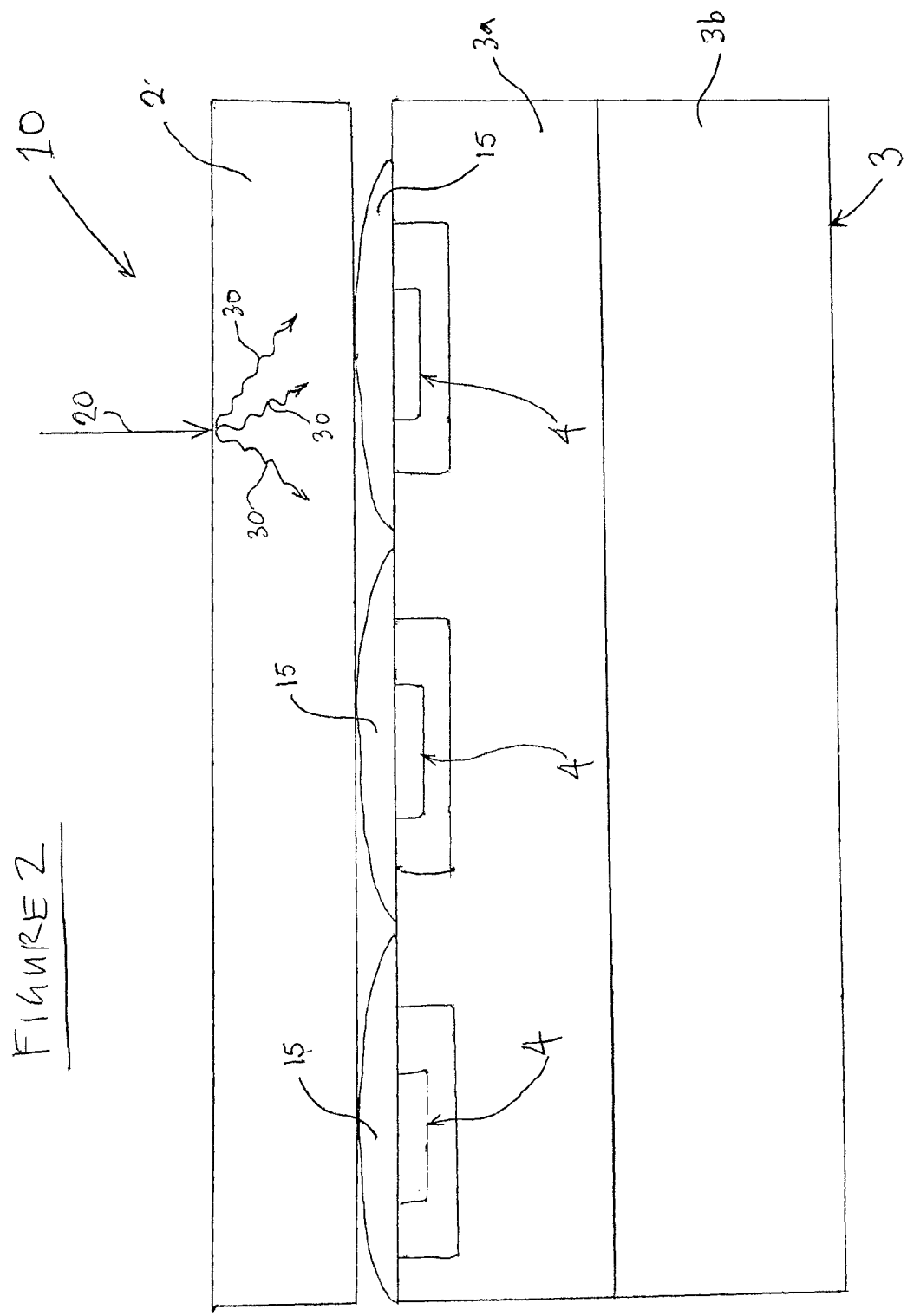
FIG. 2 is a schematic cross-sectional view of an ion detector.

Reference is now made to FIG. 2, which shows a further embodiment of an ion detector 10. The detector 10 is similar in construction and function to the detector 1, save that lenses 15 are provided between the scintillator layer 2 and the photodiode device 3. In use, the lenses 15 serve to focus the photons generated by the scintillator 2 to a respective photodetector providing a better photon collection efficiency.

Figure 3:
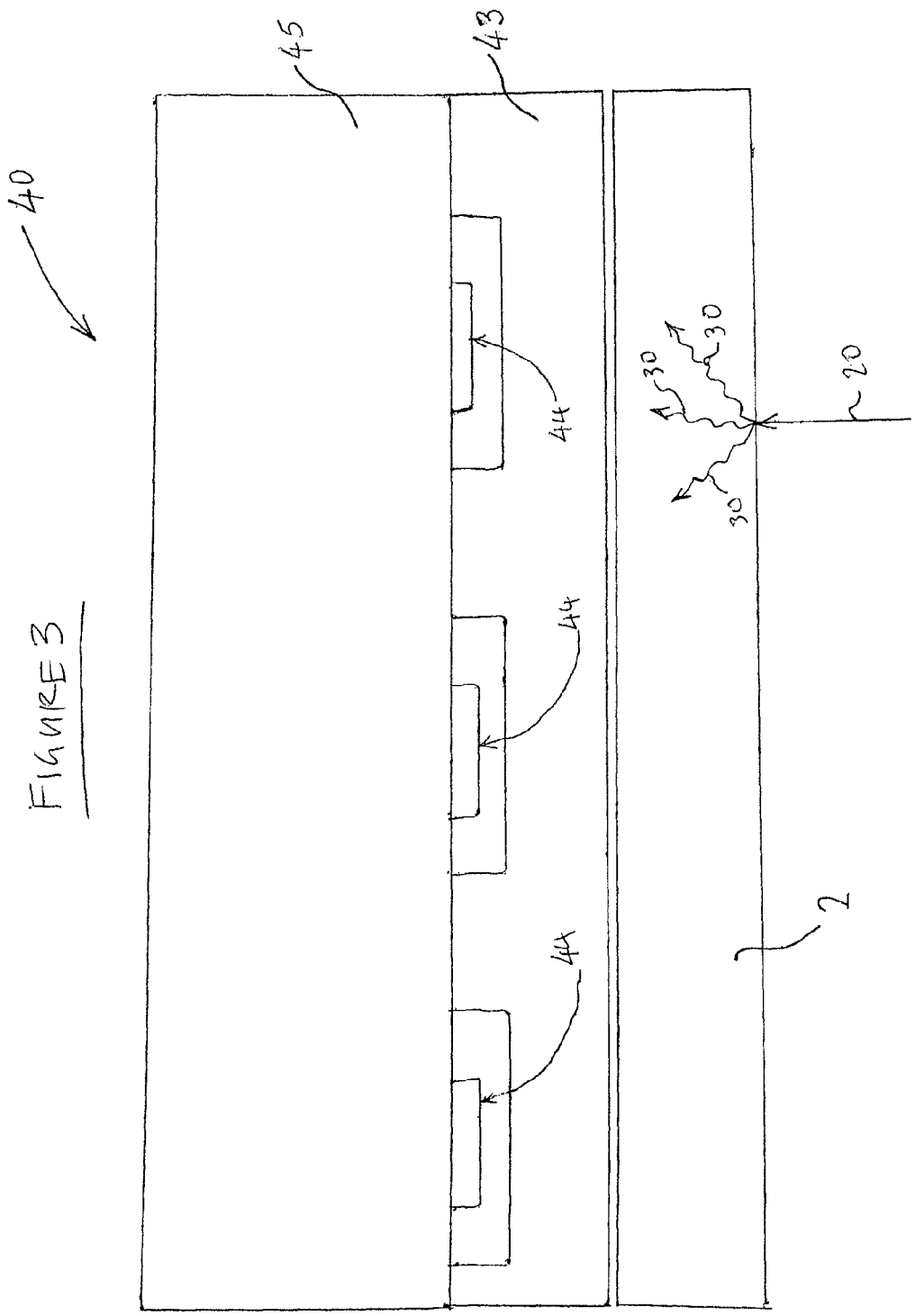
FIG. 3 is a schematic cross-sectional view of an ion detector.

FIG. 3 shows a further embodiment comprising an ion detector 40 which comprises a scintillator 2, a p-epitaxial layer 43, an array of p-n junctions 44, and a handle wafer 45. In contrast to the embodiments shown in FIGS. 1 and 2, the detector 40 photons 30 generated by the scintillation layer 2 will enter the p-epitaxial layer 43. The thickness of the epi layer 43 could be tailored to obtain sensitivity in the right area of the spectrum. The created photoelectrons will be collected by the p-n junctions 44 inducing a signal.

Figure 4:
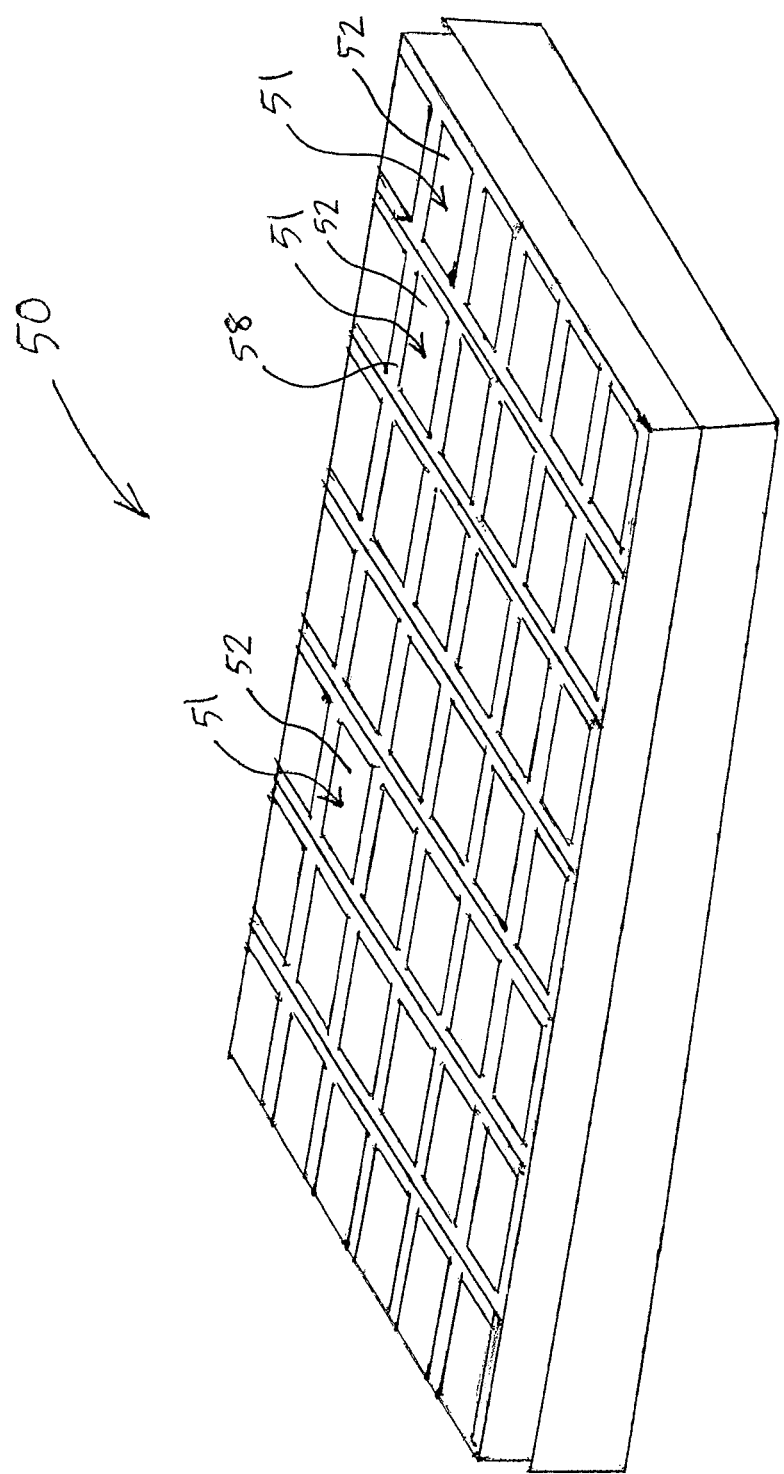
FIG. 4 is a perspective view of an ion detector.
Figure 5:
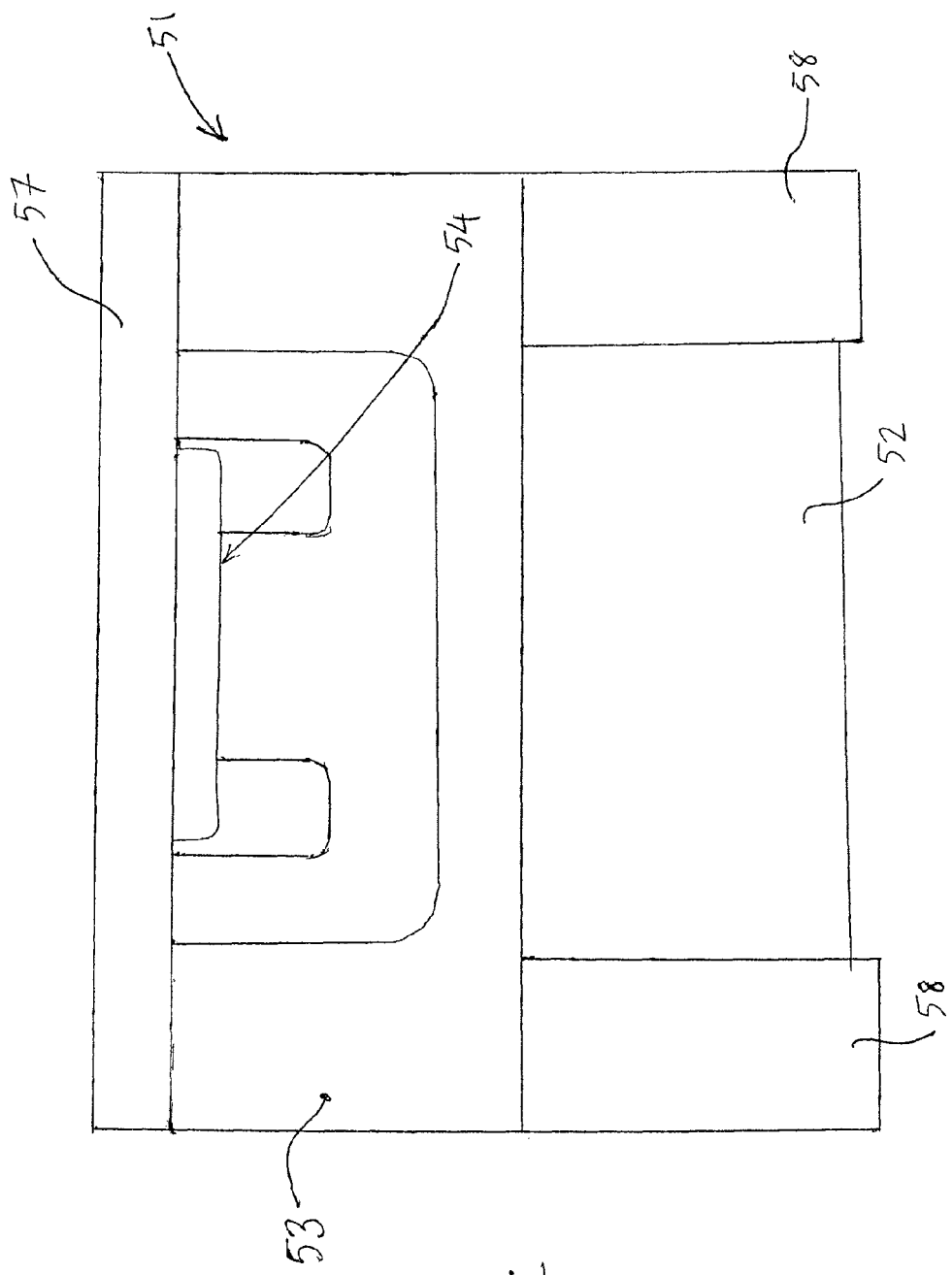
FIG. 5 is a schematic cross-sectional view of a sub-assembly of the detector of FIG. 4.

FIGS. 4 and 5 show yet a further embodiment comprising an ion detector 50 comprising an array of photodetectors 51. Each detector 51 comprises a scintillator 52, located in a respective recess defined by a surrounding wall structure 58. The detector 51 further comprises a p-n junction 54 set in a p-epitaxial layer 53. The p-epitaxial layer 53 and the p-n junction 54 are followed by a passivation layer 57. By forming the p-epitaxial layer 53 with an array of recesses, a structure is created for a scintillator specific to a respective photodetector, which reduces crosstalk between the neighbouring cells.

Advantageously, the above described embodiments each provide a fully integrated ion detector which eliminates the need for MCP's and phosphors as in standard low energy ion detectors. Unlike the use of MCP's, the above embodiments enable very high detection efficiencies, with the potential to achieve close to 100% efficiency.

The above described detectors could advantageously be used very widely in such areas as mass spectrometry, ion imaging, atom probe tomography and other areas involving detection of low energy ions.

Unlike MCP's, which are extremely fragile, and need to be operated in a vacuum, the above detectors are robust and can be used at atmospheric or higher pressures (in addition to being capable of being used under vacuum conditions). For example, the detectors could be used for ion mobility spectrometry in security applications, such as searching for illicit substances such as drugs and explosives. For such applications the detector is capable of operating under prevailing atmospheric pressure.

The above detectors lend themselves well to being manufactured by automated production. In particular, the detectors could be manufactured by the automated application of the scintillation layer onto the photodiode array by a deposition process.

The invention claimed is:

1. An ion detector, comprising:
a plurality of avalanche photodiodes configured in a spatial distribution to provide a pixelated array of photodiodes, each said avalanche photodiode in said pixelated array further comprising a semi-conductor avalanche photodiode, and the detector comprising a scintillation layer, the scintillation layer having a thickness in the range 0.1 μm to 100 μm, the scintillation layer arranged to generate photons towards the photodiode resulting from ions impinging on the scintillation layer, wherein said detector is capable of detecting ions of 10 keV.

2. A detector as claimed in claim 1 in which each said avalanche photodiode has sensitivity to detect a single photon.

3. A detector as claimed in claim 1 in which each said avalanche photodiode comprises a reversely biased photosensitive p-n junction.

4. A detector as claimed in claim 1 in which the semi-conductor avalanche photodiode is a silicon-based photodiode.

5. A detector as claimed in claim 1 in which the scintillation layer has been formed in situ on the semi-conductor avalanche photodiode by a deposition process.

6. A detector as claimed in claim 1 in which the scintillation layer is a pre-formed component attached to the semi-conductor avalanche photodiode.

7. A detector as claimed in claim 1 wherein said avalanche photodiode is capable of detecting ions having energies within a range of from 0-20 keV.

8. A detector as claimed in claim 1 consisting of an integrated device.

9. A detector as claimed in claim 1 further comprising an optical lens located between the scintillator layer and the semi-conductor avalanche photodiode.

10. A detector as claimed in claim 1 in which the thickness of the scintillator layer is less than a distance between photosensitive regions of neighbouring photodiodes of said spatially distributed array of avalanche photodiodes.

11. A detector as claimed in claim 10 in which the width of the photosensitive region is in the range 10 μm to 100 μm.

12. A detector as claimed in claim 1 in which a thickness of the scintillator layer is in the range of 0.1 to tens of μm's.

13. A method of ion detection comprising use of the detector of claim 1.

* * * * *